Aug. 30, 1938.  A. M. HOWALD  2,128,533
MEANS FOR COLORING MOLDED ARTICLES
Filed March 20, 1935
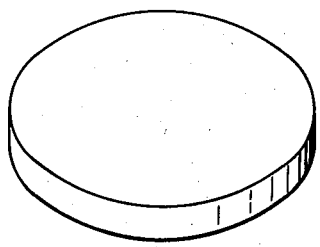
Fig. I
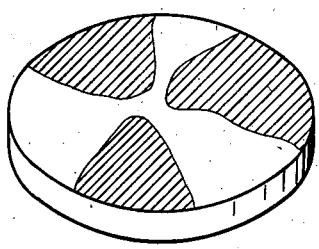
Fig. II
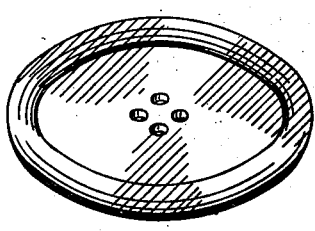
Fig. III
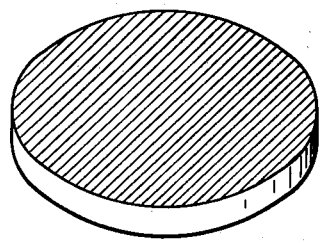
Fig. IV
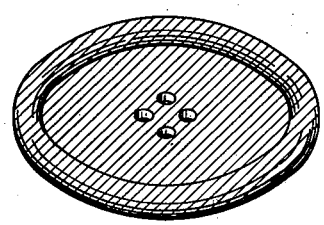
Fig. V
Arthur M. Howald
INVENTOR
BY Marshall
ATTORNEY Patented Aug. 30, 1938

2,128,533

UNITED STATES PATENT OFFICE 2,128,533

MEANS FOR COLORING MOLDED ARTICLES

Arthur M. Howald, Toledo, Ohio, assignor, by mesne assignments, to Plaskon Company, Incorporated, a corporation of Delaware Application March 20, 1935, Serial No. 11,955

6 Claims. (Cl. 18—61)

This invention relates to means for coloring molded articles and will be described as applied to the coloring of articles molded of heat-hardening compounds such as formaldehyde urea condensation products and phenol formaldehyde condensation products.

Articles molded from materials that are made in powdered form may be colored by incorporating dyes or pigments in the powder or granulated material, but the coloring matter must ordinarily be incorporated in the material when the material is manufactured, as molders who use such materials are usually not equipped to color them economically and effectively. It is possible for molders to obtain mottled effects in the coloration of molded articles by making them of material of two or more colors molded together, but to obtain mottled effects by this means required much time and skill. Surface coloration effected by coating molded articles wears off in use and it is not possible to dye nonporous molded articles effectively for the reason that there is little penetration of the dye into the material.

It is an object of this invention to provide a method whereby heat-hardened molded articles can be produced rapidly and economically in various colors, both solid and mottled, from white material or from material of a uniform color.

In order to facilitate removal of molded articles from their molds it is customary to employ lubricants, such lubricants being materials of greasy consistency which do not decompose at molded temperatures. Metallic stearate, especially zinc stearate, is extensively used, for the reason that it is solid at ordinary temperatures and can be ground and mixed as a powder into the powdered molding material. The lubricant, to be effective, should be sufficiently insoluble in the material to be molded that when the material is subjected to heat and pressure in the mold, some of the lubricant will bleed out of the material to the mold surface. Since the lubricant is mixed throughout the material, much of it remains in the molded object as mechanically-held particles, which in some cases have a deleterious effect; for example, in some molded articles translucency is desirable and the desired translucency is decreased by the presence throughout the object of mechanically-held particles of lubricant.

It is another object of this invention to provide a method of coloring the exterior of molded articles made from granular heat-hardening material and lubricating the molds in which they are formed while the interiors of such articles remain free of coloring matter and lubricant, whereby greater translucency is achieved.

Other objects and advantages will be apparent from the following description, in which reference is had to the accompanying drawing illustrating a preferred embodiment of my invention and wherein similar reference numerals designate similar parts throughout the several views.

For the purpose of reducing the bulk of charges of molding compounds so that they will not overflow their molds and for the purpose of facilitating rapid charging of multiple cavity molds with accurately measured quantities of material, as well as for the purpose of reducing the flow necessary for the material to conform to the shape of the molds, the charges are usually preformed into compressed blanks which more or less resemble the shape of the molded article.

In the drawing:—

Figure I is a view in perspective of such a compressed blank or preform in which the particles of material are pressed together with sufficient pressure to force most of the air out from among the particles and cause them to hang together well enough for careful handling, but which still is quite porous.

Figure II is a view in perspective of a similar compressed blank or preform with coloring matter applied to a part of its upper surface.

Figure III is a view in perspective of a button made from a preform, such as is illustrated in Figure II, having a partially colored upper surface.

Figure IV is a view in perspective of a compressed blank or preform with coloring matter applied to the whole of its upper surface; and Figure V is a view in perspective of a button made from a preform, such as illustrated in Figure IV, having the whole of its upper surface colored.

In carrying out my invention, the operator may treat each blank separately, or a group of preforms such as that illustrated in Figure I may be spread side by side on a board or table and lightly sprayed with a liquid containing dye or pigment, either through a stencil which exposes only parts of the upper surfaces of the blanks to the spray so that only certain areas are colored, as in Figure II, or with their entire upper areas exposed to the spray so that their entire upper surfaces are colored, as in Figure IV. After the blanks have been sprayed on one side, if it is desired that the other side be colored also, they may be turned over and sprayed on the other side with a liquid containing the same or a different color. The material of which the blanks are made may be white or any other solid color and two or more colors may be sprayed in adjacent or overlapping patterns upon blanks which have not been previously sprayed or which have been previously sprayed over all or parts of their surfaces. Any liquid which can be sprayed and is capable of holding the dye or pigment in solution or suspension may be used as a vehicle, but I prefer to use a volatile solvent, such as methanol, which may be quickly removed by evaporation, and for most effects a soluble dye is preferable to an insoluble pigment. Because of the blotter-like character of the porous surfaces of the blanks or preforms, the solution is promptly drawn into the surface by capillary action, but by light spraying, the color can be confined nearly to the surface. The depth to which the solution permeates the preforms will depend upon the amount of solution applied. Where the preforms resemble the shapes of the molded articles quite closely as a button preform resembles the shape of a molded button, the preforms need be only very lightly sprayed, but where the preforms resemble the molded objects less closely in shape, as for example when a bowl is molded from a disk-shaped preform, the coloring liquid should be applied more heavily so that the blank may be permeated to a greater depth and the color thus distributed through the parts of the material which flow to the surface during the molded operation.

When the coloring liquid is sprayed upon preforms through stencils, the colored areas may be more or less sharply demarked as indicated in Figure II, but when the material softens and flows into shape in the mold, the edges of the colored areas blend into the adjacent uncolored or differently colored areas, thus producing a pleasing, blended, mottled effect such as is found in many natural materials.

Where superior translucency is desired, the usual practice of mixing mold lubricant throughout the material to be molded may be abandoned and a suitable mold lubricant, such for example as zinc stearate, may be dissolved in the methanol or other liquid vehicle in which the coloring matter is applied. This manner of treating the material with lubricant is particularly satisfactory where the entire surface of the blank is sprayed. After evaporation of the solvent, the lubricant is left in the minute interstices among the surface granules. When the preform is placed in the mold and the material softens and flows under heat and pressure, the lubricant, being insoluble in the softened material, is forced out to the mold surface, where it acts to prevent the molded article from adhering to the mold.

The embodiment of my invention herein shown and described is to be regarded as illustrative only and it is to be understood that the invention is susceptible to variation, modification and change within the spirit and scope of the subjoined claims.

Having described my invention, I claim:

1. In a process for molding urea formaldehyde condensation materials, the steps of forming granular urea formaldehyde condensation material into a porous blank at a normal temperature, spraying upon the surface of the porous blank sufficient of a solution of dye and zinc stearate dissolved in methanol to permeate only the portion of the material that flows to the surface during molding, removing the methanol, and molding the blank thus treated under heat and pressure sufficient to fuse the condensation material and to cause lubricant to bleed to the surface and harden the condensation material with dye contained in its surface portion.

2. In a process for making colored articles, the steps of forming granular urea-formaldehyde condensation material into a porous blank at a normal temperature, spraying the porous blank with a quantity of a volatile liquid containing coloring matter and a mold lubricant which is insoluble in the urea-formaldehyde material sufficient to permeate only the portion of the material that flows to the surface during molding, evaporating the liquid, and molding the blank thus treated under sufficient heat and pressure to cause the granules of the material to coalesce and lubricant to bleed to the surface.

3. In a process for making colored articles, the steps of forming granular plastic heat-hardening material into a porous blank at a normal temperature, spraying the surface of the porous blank with a quantity of a volatile liquid containing coloring matter and a mold lubricant which is insoluble in the material sufficient to permeate only the portion of the material that flows to the surface during molding, evaporating the liquid, and molding the blank thus treated under sufficient heat and pressure to cause the granules of the material to coalesce and lubricant to bleed to the surface.

4. In a process for making colored articles, the steps of forming granular urea-formaldehyde condensation material into a porous blank at a normal temperature, spraying the surface of the porous blank with a quantity of a volatile liquid containing coloring matter sufficient to permeate only the portion of the material that flows to the surface during molding, evaporating the liquid, and molding the blank thus treated under sufficient heat and pressure to cause the condensation material to fuse about the coloring matter.

5. In a process for making colored articles, the steps of forming granular plastic heat-hardening material into a porous blank at a normal temperature, spraying through a stencil a portion of the surface of the porous blank with a quantity of a volatile liquid containing coloring matter sufficient to permeate only the portion of the material that flows to the surface during molding, evaporating the liquid, and molding the blank thus treated under heat and pressure sufficient to cause the material to fuse and harden about the coloring matter.

6. In a process for making colored articles, the steps of forming granular plastic heat-hardening material into a porous blank at a normal temperature, spraying a liquid comprising coloring matter on the surface of the blank in quantity sufficient to permeate only the portion of the material that flows to the surface during molding, and molding the blank thus treated under sufficient heat and pressure to cause the material to fuse and harden, whereby the coloring matter is suitably incorporated into the fused outer surface.

ARTHUR M. HOWALD.